United States Patent
Ohashi

(10) Patent No.: US 9,472,993 B2
(45) Date of Patent: Oct. 18, 2016

(54) ROTARY ELECTRIC MACHINE

(75) Inventor: Atsushi Ohashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 14/397,896

(22) PCT Filed: Jul. 11, 2012

(86) PCT No.: PCT/JP2012/004480
§ 371 (c)(1),
(2), (4) Date: Oct. 30, 2014

(87) PCT Pub. No.: WO2014/009998
PCT Pub. Date: Jan. 16, 2014

(65) Prior Publication Data
US 2015/0155754 A1   Jun. 4, 2015

(51) Int. Cl.
*H02K 5/16* (2006.01)
*H02K 5/173* (2006.01)

(52) U.S. Cl.
CPC ............ *H02K 5/161* (2013.01); *H02K 5/1732* (2013.01)

(58) Field of Classification Search
CPC ....... H02K 5/16; F16C 27/06; F16C 35/077; F02N 15/02; F02N 11/00
See application file for complete search history.

(56) References Cited

U.S. PATENT DOCUMENTS

| | | | | |
|---|---|---|---|---|
| 5,112,147 A | * | 5/1992 | Imamura | G11B 19/2009 384/493 |
| 6,030,128 A | * | 2/2000 | Pontzer | F16C 35/00 384/476 |
| 2008/0292234 A1 | | 11/2008 | Wada et al. | |
| 2014/0354097 A1 | * | 12/2014 | Tanaka | H02K 5/1732 310/90 |
| 2016/0056680 A1 | * | 2/2016 | Tanaka | H02K 5/02 310/43 |

FOREIGN PATENT DOCUMENTS

| | | |
|---|---|---|
| EP | 0441557 A2 | 8/1991 |
| JP | 50-59450 U | 6/1975 |
| JP | 57208318 A | 12/1982 |
| JP | 04-68458 A | 6/1992 |
| JP | 05-268742 A | 10/1993 |
| JP | 06-078488 A | 3/1994 |
| JP | 07-035147 A | 2/1995 |
| JP | 07-158647 A | 6/1995 |

(Continued)

OTHER PUBLICATIONS

International Search Report for PCT/JP2012/004480 dated Aug. 14, 2012.
Communication dated Jul. 21, 2015 from the Japanese Patent Office in counterpart application No. 2014-524497.
Communication dated Apr. 21, 2016, from the European Patent Office in counterpart application No. 12880754.2.

*Primary Examiner* — Tran Nguyen
(74) *Attorney, Agent, or Firm* — Sughrue Mion, PLLC; Richard C Turner

(57) ABSTRACT

A spacer in a rotary electric machine according to the present invention complements by thermal expansion a gap between a bearing housing portion and an outer ring of an outboard bearing that arises due to differences in thermal expansion between the bearing housing portion and the outer ring of the outboard bearing that result from heat generated during driving, and a flat portion is disposed on an inner circumference of the spacer at least one position around a circumference, the flat portion being formed so that press an outer circumferential surface of the outer ring of the bearing constantly.

10 Claims, 5 Drawing Sheets

(56) References Cited

FOREIGN PATENT DOCUMENTS

| JP | 11329806 A | 11/1999 |
| JP | 2006-57653 A | 3/2006 |
| JP | 2010-226927 A | 10/2010 |

* cited by examiner

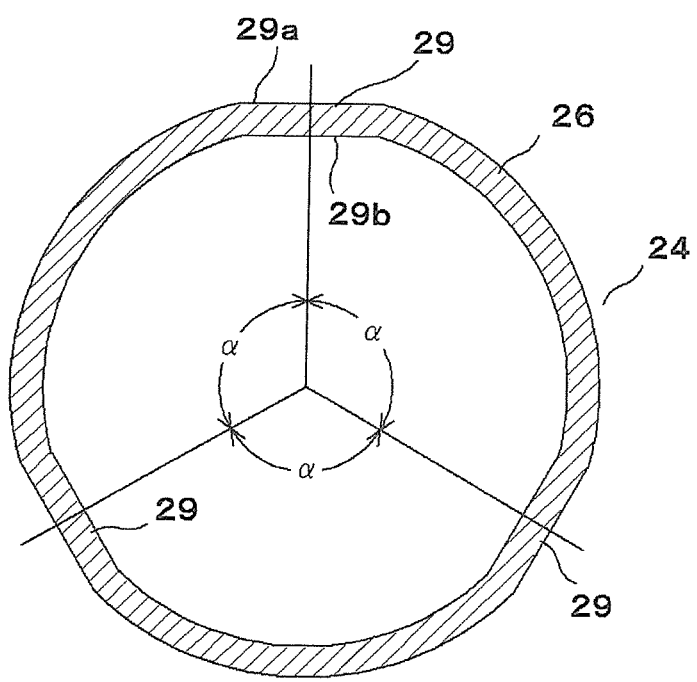

ROTARY ELECTRIC MACHINE

CROSS REFERENCE TO RELATED APPLICATIONS

This application is a National Stage of International Application No. PCT/JP2012/004480 filed Jul. 11, 2012, the contents of all of which are incorporated herein by reference in their entirety.

TECHNICAL FIELD

The present invention relates to a rotary electric machine such as an alternator that is mounted to a vehicle, for example, and particularly relates to a rotary electric machine in which bearings that support a rotor are housed in bearing housing portions of a bracket.

BACKGROUND ART

In conventional automotive alternators, an inboard bearing and an outboard bearing are disposed at two ends of a shaft in order to support a rotor, the inboard bearing is fixed to an inboard bracket by being press-fitted directly into the inboard bracket and fastening a retainer using screws, the outboard bearing is not fixed to an outboard bracket using a retainer, a resin spacer is disposed between a bearing housing portion of the outboard bracket and a bearing outer ring in order to prevent coupling strength between the bearing housing portion and the bearings from decreasing due to differences in thermal expansion between the two that result from heat generated during the driving of the automotive alternator, and the outer ring of the bearing is prevented by the spacer from rotating relative to the bearing housing portion (see Patent Literature 1, for example).

CITATION LIST

Patent Literature

[Patent Literature 1]
Japanese Patent Laid-Open No. HEI 7-158647 (Gazette)

SUMMARY OF THE INVENTION

Problem to Be Solved By the Invention

However, in conventional automotive alternators, one problem has been that if the resin spacer for preventing the rotation of the outer ring of the bearing is not in a press-fitted state between the bearing housing portion and the outer ring of the bearing at normal temperatures, but rather the resin spacer is mounted such that small gaps are disposed, then a conventional aluminum bracket is permanently deformed if a high-temperature state persists, increasing the inside diameter of the bearing housing portion, and as a result thereof the inner circumferential surface of the resin spacer expands due to heat so as to be greater than the outer circumferential surface of the bearing outer ring, forming a gap between the inner circumferential surface of the resin spacer and the outer circumferential surface of the bearing outer ring, and rotation of the bearing outer ring cannot be prevented, and also, if the resin spacer is mounted between the bearing outer ring and the bearing housing portion of the bracket in a press-fitted state around an entire circumference at normal temperatures, then heat expansion also arises on an inner circumferential side of the spacer if a high-temperature state is reached, and as a result, the inner circumferential surface of the spacer presses the bearing outer ring, applying stresses to internal portions of the bearing, and a required gap in the bearing is reduced abnormally, interfering with bearing function.

The present invention aims to solve the above problems and an object of the present invention is to provide a rotary electric machine that can reliably prevent rotation of a bearing outer ring, and prevent damage to a bearing and a bearing housing portion.

Means For Solving the Problem

In order to achieve the above object, according to one aspect of the present invention, there is provided a rotary electric machine including: a shaft; a rotor that is fixed to the shaft; bearings that are disposed rotatably on the shaft at two ends of the rotor so as to support the rotor; brackets that include bearing housing portions into which the bearings are mounted, and that rotatably support the rotor by means of the bearings; and a cylindrical resin spacer that is mounted between an outer ring outer circumference of the bearings and an inner circumference of the bearing housing portion, wherein the spacer is configured such that a radial wall thickness thereof is set so as to be smaller than a gap between the bearing outer ring outer circumference and the bearing housing portion inner circumference, and a flat portion is disposed on an inner circumference at at least one position around a circumference thereof such that the flat portion presses the bearing outer ring outer circumference constantly.

Effects of the Invention

According to the rotary electric machine according to the present invention, because the flat portion that is disposed on the inner circumference of the spacer is configured so as to press the outer circumference of the bearing outer ring constantly, relative rotation between the bearing outer ring and the spacer that results from heat generated during driving of the rotary electric machine can be prevented, enabling damage to the bearings and the bearing housing portion to be prevented.

Consequently, because it is not necessary to use special bearings, cost reductions are enabled, and because the outer ring of the bearing will not rotate relative to the spacer, device durability can be improved, and reliability can be increased. Furthermore, because rotation is prevented by pressing the bearing outer ring using a flat portion that is disposed partially around the circumference of the spacer, interference with bearing function that accompanies application of stresses inside the bearings can be eliminated even if a high-temperature state is reached.

BRIEF DESCRIPTION OF THE DRAWINGS

FIG. 8 is a cross section that shows a spacer of an automotive alternator according to Embodiment 3 of the present invention.

DESCRIPTION OF EMBODIMENTS

Embodiment 1

Figure 1:
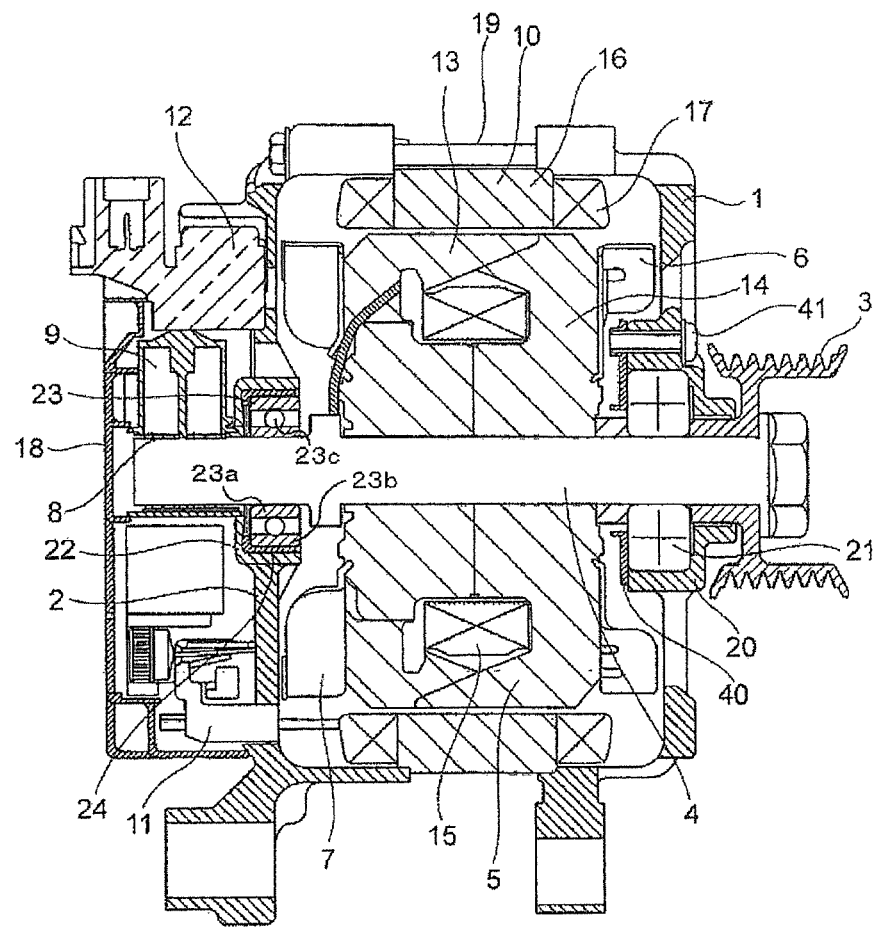
FIG. 1 is a lateral cross section that shows an automotive alternator according to Embodiment 1 of the present invention.
Figure 2:
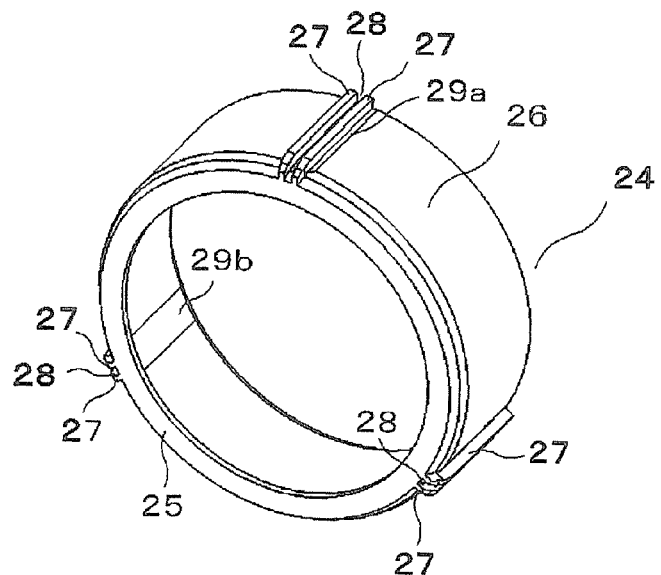
FIG. 2 is an oblique projection that shows a cylindrical spacer from FIG. 1.
Figure 3:
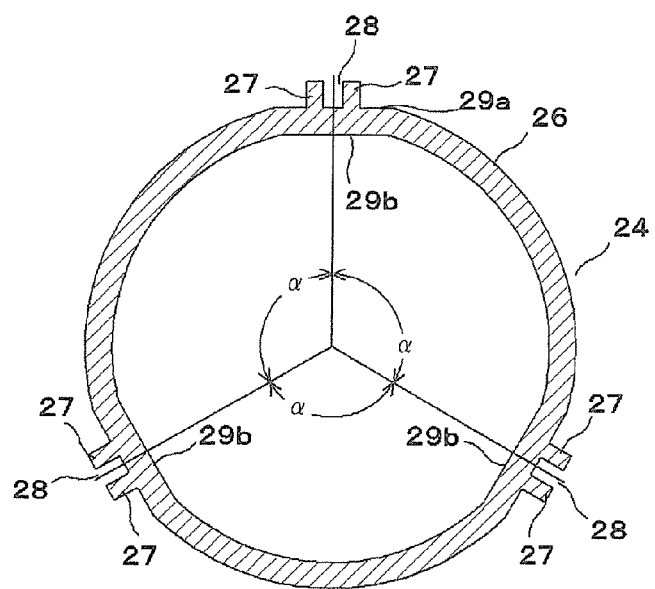
FIG. 3 is a cross section that shows the spacer from FIG. 1.
Figure 4:
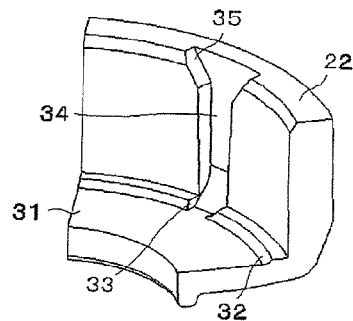
FIG. 4 is a partial oblique projection that shows an inner side of a bearing housing portion from FIG. 1.
Figure 5:
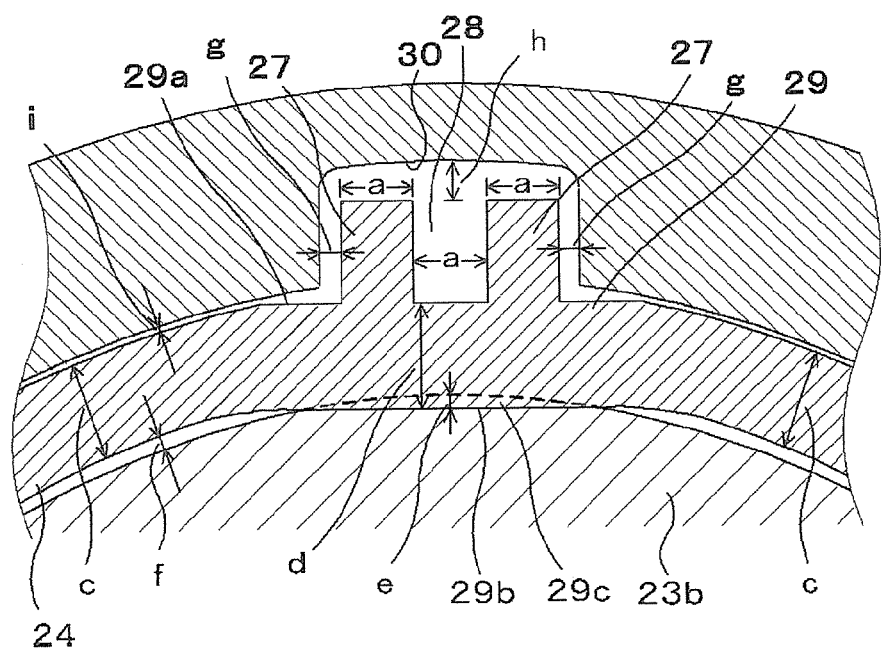
FIG. 5 is a partial enlarged cross section that shows a configuration of the bearing housing portion of a bracket, the spacer, and a bearing outer ring of the automotive alternator that is shown in FIG. 1.

FIG. 1 is a lateral cross section that shows an automotive alternator according to Embodiment 1 of the present invention, FIG. 2 is an oblique projection that shows a cylindrical spacer from FIG. 1, FIG. 3 is a cross section that shows the spacer from FIG. 1, FIG. 4 is a partial oblique projection that shows an inner side of a bearing housing portion from FIG. 1, and FIG. 5 is a partial enlarged cross section that shows a configuration of the bearing housing portion of a bracket, the spacer, and a bearing outer ring of the automotive alternator that is shown in FIG. 1.

This automotive alternator (hereinafter abbreviated to "alternator") includes: a case that is constituted by an inboard bracket 1 and an outboard bracket 2; a resin cover 18 that covers an entire surface of the outboard bracket 2; a shaft 4 that is disposed inside the case, and onto a first end of which a pulley 3 is mounted; a rotor 5 that is mounted onto the shaft 4; an inboard fan 6 that is mounted onto an end of the rotor 5 near the inboard bracket 1; and an outboard fan 7 that is mounted onto an end near the outboard bracket 2.

This alternator also includes: slip rings 8 for supplying electric current to the rotor 5 that are mounted onto the shaft 4; a pair of brushes 9 that slide on the slip rings 8; a stator 10 that is fixed to the inboard bracket 1 and the outboard bracket 2; rectifiers 11 that are electrically connected to the stator 10, and that rectify alternating currents that are generated in the stator 10 into direct currents; and a regulator 12 that adjusts alternating-current voltages that are generated in the stator 10.

The rotor 5 has: a facing pair of claw-shaped magnetic poles 13 and 14; and a rotor coil 15 in which conducting wires are wound inside these claw-shaped magnetic poles 13 and 14.

The stator 10 has: a stator core 16; and a stator coil 17 in which conducting wires are wound into slots (not shown) of the stator core 16. The stator coil 17 is constituted by two three-phase alternating current windings in each of which three winding portions (not shown) are wye-connected into three phases.

The inboard bracket 1 and the outboard bracket 2 are made of aluminum, are formed into bowl shapes, and are integrated by facing respective opening portions of the bowl shapes toward each other and fastening them using locking bolts 19.

A bearing housing portion 20 is formed centrally on the inboard bracket 1. An inboard bearing 21 that rotatably supports the shaft 4 is press-fitted into and housed in the bearing housing portion 20. This inboard bearing 21 is fixed to the inboard bracket 1 by fastening a retainer 40 using screws 41.

A bearing housing portion 22 is formed centrally on the outboard bracket 2. An outboard bearing 23 that rotatably supports the shaft 4 is mounted into the bearing housing portion 20 by means of a cylindrical resin spacer 24. The outboard bearing 23 is constituted by: an inner ring 23a that is fixed to the shaft 4; an outer ring 23b that is fixed inside the bearing housing portion 22 by means of the spacer 24; and balls 23c that are mounted between the outer ring 23b and the inner ring 23a.

This spacer 24 complements by heat expansion a gap between the bearing housing portion 22 and the outer ring 23b of the outboard bearing 23 that arises due to differences in thermal expansion between the bearing housing portion 22 and the outer ring 23b of the outboard bearing 23 that result from heat generated during driving.

The spacer 24, which is shown in FIG. 2, is a cylindrical shape that covers an overall axial length of the outer ring 23b of the outboard bearing 23, and is made of a polybutylene terephthalate (PBT) resin. A radial wall thickness c (c=0.98 mm, for example) of the spacer 24 is set so as to be smaller than a gap between an outer circumferential diameter of the bearing outer ring 23b and an inner circumferential diameter of the bearing housing portion 22.

An engaging portion 25 is formed around an entire circumference on an edge portion of the spacer 24 at an opposite end from the rotor 5. This engaging portion 25 protrudes radially inward from a spacer main body 26.

Pairs of ribs 27 that are formed so as to extend over an entire width of the spacer main body 26 in an axial direction are also formed on an outer circumferential surface thereof.

The pairs of ribs 27 are formed at three positions at a uniform pitch around the circumference of the spacer 24.

A slit 28 that has a dimension a (a=0.8 mm) that is equal to a width of the ribs 27 is disposed between the ribs 27 in each pair.

Flat portions 29 are also formed at the three positions around the circumference of the spacer 24 at which the ribs 27 are formed, the pair of ribs 27 are formed integrally so as to protrude from the flat portions 29, and a radial wall thickness d of the flat portions 29 is set to 0.98 mm.

Inner circumferential surfaces 29b of the flat portions 29 are configured on an inner circumference of the spacer 24 so as to have chord shapes, and a dimension e (0.065 mm, for example) is set so as to press an outer circumferential surface of the bearing outer ring 23b constantly at room temperature. A gap f (0.025 mm, for example) is also set between the outer circumferential surface of the bearing outer ring 23b and the inner circumferential surface of the spacer 24 except at the flat portions 29 at room temperature. The values of the above dimension e and of the gap f are set such that only the inner circumferential surfaces of the flat portions 29 press the outer circumferential surface of the bearing outer ring 23b constantly to achieve a detent function on the bearing outer ring 23b even if a high-temperature state persists.

The pairs of ribs 27 are formed integrally with the spacer 24 on outer circumferential surfaces 29a of the flat portions 29 so as to have the slits 28 interposed.

Engaging recess portions 30 that are formed on portions of the bearing housing portion 22 that face the flat portions 29 radially are formed so as to stop rotation of the spacer 24 by engaging with the ribs 27. Moreover, a gap g between the ribs 27 and the side walls of the engaging recess portions 30 is set to 0.2 mm, for example, and a gap h between the ribs 27 and the outer circumferential walls of the engaging recess portions 30 is set to 0.39 mm, for example. The dimension of the gap h is set to a value such that an outer circumferential surface of each of the ribs 27 will not contact an inner circumferential surface of the engaging recess portions 30 of the bearing housing portion 22 even if a high-temperature state persists.

A gap i between an outer circumferential surface of the spacer 24 and an inner circumferential surface of the bearing housing portion 22 is set to 0.014 mm, for example, except at the flat portion outer circumferential surfaces 29a on the spacer 24.

Here, an outside diameter of the outer ring 23b of the bearing 23 is set to 35 mm, an inside diameter of the spacer 24 to 35.05 mm, an outside diameter of the spacer 24 to 37.01 mm, and an inside diameter of the bearing housing portion 22 of the bracket 2 to 37.038 mm.

Consequently, the gap f is set to 0.025 mm, and the gap i to 0.014 mm, as mentioned above.

FIG. 4 is a partial oblique projection of the bearing housing portion 22 of the outboard bracket 2 when viewed from inside.

Formed on the bearing housing portion 22 are: a flange portion 31 through which the shaft 4 passes; a tapered portion 32 with which the engaging portion 25 of the spacer 24 is engaged; and engaging portions 33 with which the leading ends of the ribs 28 of the spacer 24 are engaged.

Rib housing portions 34 that extend axially are formed on an inner circumferential surface of the bearing housing portion 22 such that leading end portions are connected to the engaging portion 33, and tapered notch portions 35 are formed at entrance portions of the rib housing portions 34.

In an alternator that has the above configuration, an electric current is supplied from a battery (not shown) through the brushes 9 and the slip rings 8 to the rotor coil 15 of the rotor 5 to generate magnetic flux, giving rise to North-seeking (N) poles and South-seeking (S) poles, respectively, in the claw-shaped magnetic poles 13 and 14 of the rotor 5.

At the same time, because the pulley 3 is driven by an engine such that the rotor 5 is rotated by the shaft 4, rotating magnetic fields are applied to the stator core 16, giving rise to electromotive forces in the stator coil 17.

The magnitude of these electromotive forces is adjusted by the regulator 12, which adjusts electric current that flows through the rotor coil 15.

The alternating current that arises due to the electromotive forces passes through the rectifiers 11 and is rectified into direct current, and charges the battery.

Now, the outboard bearing 23 is housed in the bearing housing portion 22 of the outboard bracket 2 in which the rectifiers 11 and the regulator 12, which are heat-generating parts, are disposed.

Because of that, heat that is generated by the heat-generating parts is transferred to the outboard bearing 23 through the outboard bearing housing portion 22, and heat that is generated in the rotor coil 15 is transferred to the shaft 4 through the claw-shaped magnetic poles 13 and 14, and this heat is transferred to the outer ring 23b of the outboard bearing 23, making the bearing housing portion 22, the spacer 24, and the outer ring 23b of the outboard bearing 23 expand due to heat.

Here, because the bearing housing portion 22 is made of aluminum, and the outer ring 23b of the outboard bearing 23 is made of carbon steel, the heat expansion enlarges the gap between the bearing housing portion 22 and the outer ring 23b of the outboard bearing 23.

At the same time, because the coefficient of linear expansion of the spacer 24 is large and the spacer expands due to heat to complement the increase in the gap between the bearing housing portion 22 and the outer ring 23b of the outboard bearing 23, coupling strength between the bearing housing portion 22 and the outer ring 23b of the outboard bearing 23 is ensured by means of the spacer 24.

Specifically, because the inner circumferential surfaces 29b of the flat portions 29 of the spacer 24 continue to press the bearing outer ring 23b at three positions around the circumference thereof even if subjected to heat from the heat-generating parts so as to enter a high-temperature state, relative rotation between the spacer 24 and the bearing outer ring 23b does not occur.

The ribs 27 of the spacer 24 also expand due to heat at high temperature, expanding radially outward and circumferentially due to the heat, but dimension h and dimension g are respectively set such that none of the ribs 27 will be placed in pressure contact with the inner circumferential surfaces of the bearing housing portion 22.

Each of the ribs 27 has a predetermined micro-gap from a circumferential inner surface of the bearing housing portion 22, and as a result, the ribs 27 of the spacer 24 come into contact with the facing circumferential inner surfaces of the bearing housing portion 22 in a direction of rotation during rotation of the shaft 4 to stop rotation of the spacer 24 relative to the bearing housing portion 22.

Moreover, in Embodiment 1, when mounting the spacer 24 into the bearing housing portion 22, ends of the ribs 27 on which the annular engaging portion 25 is formed are inserted while being fitted into the rib housing portions 34 by means of the notch portions 35 of the bearing housing portion 22, the leading ends of the ribs 27 are engaged with the engaging portions 33 and the engaging portion 25 of the spacer 24 is pressed against the tapered portion 32, so as to be mounted in contact with the flange portion 31.

Because the ribs 27 are all housed in the bearing housing portion 22 simultaneously such that each of the pairs of ribs 27 is disposed at three positions every 120 degrees around the circumference thereof, mounting can be facilitated greatly, improving workability.

Because the flat portion inner circumferential surfaces 29b of the spacer 24 also press and hold the outer circumferential surface of the bearing outer ring 23b even at normal temperatures, a mounting operation of the bearing 23 is facilitated because rotation between the outer ring 23b of the bearing 23 and the spacer 24 is prevented even during mounting at normal temperatures.

Because the ribs 27 are disposed on the spacer 24 in pairs, and the slits 28 are disposed between the ribs 27, the circumferential wall thickness of the ribs 27 can be reduced, and shrinkage due to thermal contraction at high temperatures that arises in the resin material of the spacer 24 can be prevented, and as a result thereof the radial wall thickness of the flat portions 29 of the spacer 24 can be made uniform, thereby enabling the function of the spacer 24 to be exhibited more reliably.

Moreover, it is not necessary to form the ribs 27 that are disposed on the spacer 24 over the entire axial width of the spacer 24, and the outer circumferential portion of the spacer 24 may be disposed on a portion of the overall axial width so as to protrude and engage the recess portion 30 of the bearing housing portion 22 to prevent mutual rotation. Furthermore, a single rib 27 may be disposed on the flat portions 29. Furthermore, an example is shown in which the ribs 27 are disposed at three positions around the circumference, but is not limited thereto.

Embodiment 2

Figure 6:
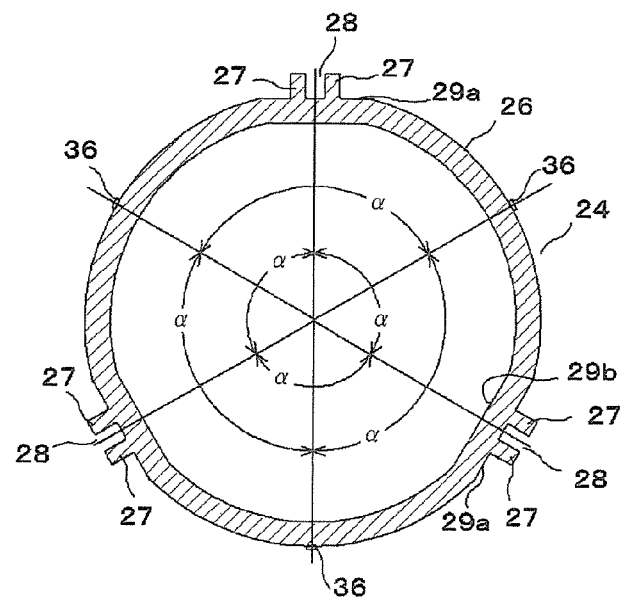
FIG. 6 is a cross section that shows a spacer of an automotive alternator according to Embodiment 2 of the present invention.
Figure 7:
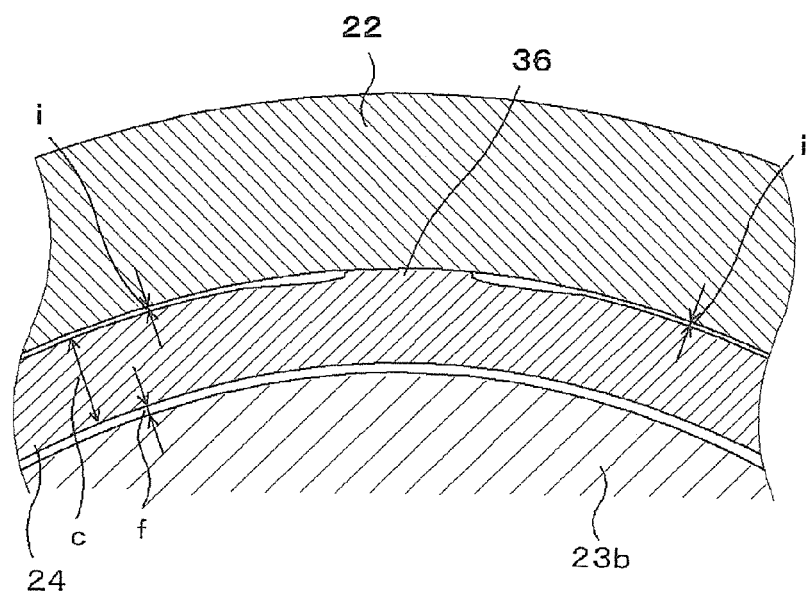
FIG. 7 is a partial cross section that shows a mounted state of the spacer that is shown in FIG. 6.

FIG. 6 is a cross section that shows a spacer 24 of an automotive alternator according to Embodiment 2 of the present invention, and FIG. 7 is a partial enlarged cross section of FIG. 6.

In this embodiment, salient portions 36 that can press into an inner circumferential surface of the bearing housing portion 22 constantly at normal temperatures are formed on an outer circumferential surface of a spacer 24 at circumferentially central portions between portions on which ribs 27 are mounted. As shown in FIG. 6, three of these salient portions 36 are respectively formed at a uniform pitch of 120 degrees (angle α) around a circumference on the outer circumferential surface of the spacer 24 at central positions between portions on which pairs of ribs 27 are mounted. The salient portions 36 are formed integrally with the spacer 24, and press the inner circumferential surface of the bearing housing portion 22 as shown in FIG. 7 at normal temperatures, and the salient portions 36 on the outer circumferential surface of the spacer 24 press the inner circumferential surface of the bearing housing portion 22 to stop rotation between the spacer 24 and the bearing housing portion 22 even in a high-temperature state. Furthermore, flat portions 29b that are formed on an inner circumferential surface of the spacer 24 are configured so as to press the outer circumferential surface of the bearing outer ring 23b with a predetermined pressing force both at normal temperatures and at high temperatures.

Consequently, because the spacer 24 stops rotation relative to the bearing outer ring 23b and the bearing housing portion 22 respectively using the flat portion inner circumferential surfaces 29b on the inner circumferential surface thereof, and using the salient portions 36 on the outer circumferential surface thereof, detent between the bearing outer ring 23 and the spacer 24 and between the bearing housing portion 22 and the spacer 24 can be performed more reliably.

In addition, because the flat portions 29 and the salient portions 36 that are disposed on the spacer 24 are respectively disposed on the inner circumferential surface and the outer circumferential surface of the spacer 24 so as to be respectively at a uniform pitch around the circumference of the spacer 24, the detent function can be exhibited by the spacer 24 in a well-balanced manner, making the rotation preventing operation more reliable, thereby enabling devices that have improved durability to be provided.

Embodiment 3

FIG. 8 is a cross section that shows a spacer 24 of an automotive alternator according to Embodiment 3 of the present invention.

In this embodiment, only flat portions 29 that press an outer circumferential surface of a bearing outer ring 23b to perform rotation prevention relative to the bearing outer ring 23b both at normal temperatures and at high temperatures are formed on a spacer 24. Ribs 27 and salient portions 36 are not disposed as they were in Embodiments 1 and 2 above.

In other words, in this embodiment, because the bearing outer ring 23b is pressed constantly by disposing the flat portions 29 on the spacer 24 and rotation between the spacer 24 and the bearing outer ring 23b can be prevented particularly during a high-temperature state, relative rotation between the bearing outer ring 23b and the spacer 24 that results from heat generated during driving the alternator can be prevented, and functional decline of the bearing due to the entire inner circumferential surface of the spacer 24 pressing the bearing outer ring 23b as in conventional cases can also be prevented.

In each of the above embodiments, examples are shown in which inner circumferential surfaces 29c of the flat portions 29 of the spacer 4 are formed so as to approximate a chord, but are not limited thereto, and a different shape may be used provided that the bearing outer ring 23b is pressed to achieve a detent function.

Moreover, in each of the above embodiments, an alternator that is used as an automotive alternator has been explained, but of course the present invention is not limited thereto, and can be applied to an outboard motor alternator, for example.

The present invention can also be applied to electric motors.

The present invention can also be applied to electric motor-generators that function both as an electric motor and as a generator.

EXPLANATION OF NUMBERING

1 INBOARD BRACKET; 2 OUTBOARD BRACKET; 3 PULLEY; 4 SHAFT; 5 ROTOR; 6 INBOARD FAN; 7 OUTBOARD FAN; 8 SLIP RING; 9 BRUSH; 10 STATOR; 11 RECTIFIER; 12 REGULATOR; 13, 14 CLAW-SHAPED MAGNETIC POLE; 15 ROTOR COIL; 16 STATOR CORE; 17 STATOR COIL; 18 RESIN COVER; 19 LOCKING BOLT; 20, 22 BEARING HOUSING PORTION; 21 INBOARD BEARING; 23 OUTBOARD BEARING; 23A INNER RING; 23B OUTER RING; 23C BALL; 24 SPACER; 25 ENGAGING PORTION; 26 SPACER MAIN BODY; 27 RIB; 28 SLIT; 29 FLAT PORTION; 29A OUTER CIRCUMFERENTIAL SURFACE; 29B INNER CIRCUMFERENTIAL SURFACE; 30 ENGAGING RECESS PORTION; 31 FLANGE PORTION; 32 TAPERED PORTION; 33 ENGAGING PORTION; 34 RIB HOUSING PORTION; 35 NOTCH PORTION; 36 SALIENT PORTION.

The invention claimed is:

1. A rotary electric machine comprising:
a shaft;
a rotor that is fixed to the shaft;
bearings that are disposed rotatably on the shaft at two ends of the rotor so as to support the rotor;
brackets that include bearing housing portions into which the bearings are mounted, and that rotatably support the rotor by means of the bearings; and
a cylindrical resin spacer that is mounted between an outer circumference of an outer ring of the bearing and an inner circumference of the bearing housing portion, wherein the spacer is configured such that a radial wall thickness thereof is set so as to be smaller than a gap between the outer circumference of the bearing outer ring and the inner circumference of the bearing housing portion, and a flat portion is disposed on an inner circumference at at least one position around a circumference thereof such that the flat portion presses the bearing outer ring outer circumference constantly.

2. The rotary electric machine according to claim 1, wherein a plurality of the flat portions are disposed around the circumference.

3. The rotary electric machine according to claim 2, wherein the flat portions are arranged uniformly around the circumference.

4. The rotary electric machine according to claim 1, wherein the flat portion is configured so as to form a chord shape on the inner circumference of the spacer.

5. The rotary electric machine according to claim 1, wherein:
- a rib is disposed on an outer circumference of the flat portion of the spacer that includes the flat portion;
- a recess portion that houses the rib is disposed on the bearing housing portion; and
- a gap between an inner circumference of the recess portion and an outer circumference of the rib is set such that the rib will not come into contact with the recess portion even if the spacer expands due to heat.

6. The rotary electric machine according to claim 5, wherein a spacer outer circumference on which the rib is disposed is constituted by a flat portion.

7. The rotary electric machine according to claim 5, wherein two of the ribs are disposed as a pair so as to have a slit interposed in a circumferential direction.

8. The rotary electric machine according to claim 5, wherein the rib is formed over an entire axial width of an outer circumference of the spacer.

9. The rotary electric machine according to claim 1, wherein a salient portion that can constantly press into the inner circumference of the bearing housing portion is disposed on an outer circumference of the spacer at at least one position around the circumference.

10. The rotary electric machine according to claim 1, wherein flat portions that are disposed on the spacer are disposed at three positions uniformly around the circumference; and
- salient portions that are disposed on the spacer are respectively disposed at three positions that are at central positions between adjacent flat portions.

* * * * *